(12) United States Patent
Hayama et al.

(10) Patent No.: US 11,555,489 B2
(45) Date of Patent: Jan. 17, 2023

(54) CAPACITY CONTROL VALVE

(71) Applicant: EAGLE INDUSTRY CO., LTD., Tokyo (JP)

(72) Inventors: Masahiro Hayama, Tokyo (JP); Kohei Fukudome, Tokyo (JP); Takahiro Ejima, Tokyo (JP); Daichi Kurihara, Tokyo (JP); Wataru Takahashi, Tokyo (JP); Keigo Shirafuji, Tokyo (JP); Yoshihiro Ogawa, Tokyo (JP)

(73) Assignee: EAGLE INDUSTRY CO., LTD.

( * ) Notice: Subject to any disclaimer, the term of this patent is extended or adjusted under 35 U.S.C. 154(b) by 0 days.

(21) Appl. No.: 17/256,955

(22) PCT Filed: Jul. 9, 2019

(86) PCT No.: PCT/JP2019/027072
§ 371 (c)(1),
(2) Date: Dec. 29, 2020

(87) PCT Pub. No.: WO2020/013155
PCT Pub. Date: Jan. 16, 2020

(65) Prior Publication Data
US 2021/0123423 A1     Apr. 29, 2021

(30) Foreign Application Priority Data

Jul. 12, 2018 (JP) .............................. JP2018-132688

(51) Int. Cl.
*F04B 27/18* (2006.01)
*F16K 31/06* (2006.01)

(52) U.S. Cl.
CPC ...... *F04B 27/1804* (2013.01); *F16K 31/0606* (2013.01); *F04B 2027/185* (2013.01);
(Continued)

(58) Field of Classification Search
CPC .......... F04B 27/1804; F04B 2027/1813; F04B 2027/1827; F04B 2027/1831;
(Continued)

(56) References Cited

U.S. PATENT DOCUMENTS 6,010,312 A    1/2000    Suitou et al. ............. F04B 1/26
6,354,811 B1   3/2002    Ota et al. ................... 417/222.2
(Continued)

FOREIGN PATENT DOCUMENTS

EP    1081378    3/2001    .............. F04B 27/18
EP    2594794    5/2013    .............. F04B 27/18
(Continued)

OTHER PUBLICATIONS

International Search Report and Written Opinion issued in PCT/JP2019/043374, dated Jan. 7, 2020, with English translation, 10 pages.
(Continued)

*Primary Examiner* — Devon C Kramer
*Assistant Examiner* — Joseph S. Herrmann
(74) *Attorney, Agent, or Firm* — Hayes Soloway P.C.

(57) ABSTRACT

A capacity control valve includes a valve housing provided with a discharge port, suction ports, and a control port and a primary valve including a primary valve seat and a primary valve body driven by a solenoid, the primary valve being configured to open and close a communication between the discharge port and the control port in accordance with a movement of the primary valve body. The capacity control valve further includes a differential CS valve which is openable and closable by a pressure difference between the control pressure Pc and the suction pressure Ps and an electromagnetic CS valve that is openable and closable so as to close the control port and the suction port in a non-
(Continued)

energized state of the solenoid 80 in accordance with the movement of the primary valve body.

19 Claims, 6 Drawing Sheets

(52) U.S. Cl.
CPC ............... *F04B 2027/1813* (2013.01); *F04B 2027/1827* (2013.01); *F04B 2027/1831* (2013.01); *F04B 2027/1845* (2013.01); *F04B 2027/1859* (2013.01)

(58) Field of Classification Search
CPC ........ F04B 2027/1845; F04B 2027/185; F04B 2027/1859; F16K 31/0606
See application file for complete search history.

(56) References Cited

U.S. PATENT DOCUMENTS

| | | | |
|---|---|---|---|
| 6,358,017 B1 * | 3/2002 | Ota ..................... | F04B 27/1804 417/222.2 |
| 6,361,283 B1 | 3/2002 | Ota et al. .................... | 417/222.2 |
| 6,485,267 B1 | 11/2002 | Imai et al. ................. | F04B 1/26 |
| 8,021,124 B2 | 9/2011 | Umemura et al. ......... | 417/222.2 |
| 8,079,827 B2 | 12/2011 | Iwa et al. .................... | 417/222.2 |
| 9,732,874 B2 | 8/2017 | Saeki et al. ......... | F04B 27/1804 |
| 9,777,863 B2 | 10/2017 | Higashidozono ... | F04B 27/1804 |
| 11,053,933 B2 | 7/2021 | Warren ............... | F04B 27/1804 |
| 11,085,431 B2 | 8/2021 | Fukudome .............. | F04B 27/18 |
| 11,156,301 B2 * | 10/2021 | Hayama ............... | F16K 31/0627 |
| 2004/0060604 A1 | 4/2004 | Uemura et al. ............... | 137/595 |
| 2005/0035321 A1 | 2/2005 | Uemura ................ | F16K 37/041 |
| 2005/0287014 A1 | 12/2005 | Umemura ........... | F04B 27/1804 |
| 2006/0218953 A1 | 10/2006 | Hirota .......................... | 62/228.5 |
| 2007/0214814 A1 | 9/2007 | Umemura et al. ........... | 62/228.1 |
| 2008/0138213 A1 * | 6/2008 | Umemura ........... | F04B 27/1804 137/625.65 |
| 2009/0108221 A1 | 4/2009 | Umemura et al. .. | F04B 27/1804 |
| 2009/0183786 A1 | 7/2009 | Iwa et al. .................... | 137/487.5 |
| 2012/0198992 A1 | 8/2012 | Futakuchi et al. .............. | 91/505 |
| 2012/0198993 A1 | 8/2012 | Fukudome et al. .... | F04B 27/18 |
| 2013/0126017 A1 | 5/2013 | Ota et al. ............. | F04B 27/1804 |
| 2014/0130916 A1 | 5/2014 | Saeki ................... | F04B 27/1804 |
| 2015/0004010 A1 | 1/2015 | Saeki ................... | F04B 27/1804 |
| 2015/0068628 A1 | 3/2015 | Iwa et al. ................ | F16K 31/06 |
| 2015/0211506 A1 | 7/2015 | Shirafuji et al. .... | F04B 27/1804 |
| 2015/0345655 A1 * | 12/2015 | Higashidozono ... | F04B 27/1804 137/624.27 |
| 2016/0290326 A1 | 10/2016 | Sugamura ........... | F04B 27/1804 |
| 2017/0175726 A1 | 6/2017 | Kume ................. | F04B 27/1804 |
| 2017/0028462 A1 | 10/2017 | Hayama et al. ........ | F16K 47/06 |
| 2017/0284562 A1 | 10/2017 | Hayama et al. ........ | F16K 47/06 |
| 2017/0356430 A1 | 12/2017 | Irie et al. ............ | F04B 27/1804 |
| 2018/0291888 A1 | 10/2018 | Tonegawa ........... | F16K 31/0624 |
| 2020/0362974 A1 | 11/2020 | Hayama et al. ........ | F04B 49/22 |
| 2021/0285433 A1 | 9/2021 | Hayama .............. | F04B 27/1804 |
| 2022/0034414 A1 | 2/2022 | Ito .......................... | F04B 27/18 |

FOREIGN PATENT DOCUMENTS

| | | | | |
|---|---|---|---|---|
| EP | 2 784 320 | | 10/2014 | ............. F04B 27/18 |
| EP | 2784320 A2 * | | 10/2014 | ......... F04B 27/1804 |
| EP | 3 431 760 | | 1/2019 | ............. F04B 27/18 |
| JP | 5-306679 | | 11/1993 | ............. F04B 27/08 |
| JP | 6-200875 | | 7/1994 | ............. F04B 27/08 |
| JP | 7-27049 | | 1/1995 | ............. F04B 27/10 |
| JP | 9-144929 | | 6/1997 | ............. F16K 31/06 |
| JP | 2000-345961 | | 12/2000 | ............. F04B 27/14 |
| JP | 2001-73939 | | 3/2001 | ............. F04B 27/14 |
| JP | 2001-132632 | | 5/2001 | ............. F04B 27/14 |
| JP | 2003-42062 | | 2/2003 | ............. F04B 27/14 |
| JP | 2006-52648 | | 2/2006 | ............. F04B 27/14 |
| JP | 2006-307828 | | 11/2006 | ............. F04B 27/14 |
| JP | 2007-247512 | | 9/2007 | ............. F04B 27/14 |
| JP | 2008-14269 | | 1/2008 | ............. F04B 27/14 |
| JP | 2008-202572 | | 9/2008 | ............. F04B 27/14 |
| JP | 4242624 | | 1/2009 | ............. F04B 49/00 |
| JP | 2011-32916 | | 2/2011 | ............. F04B 27/14 |
| JP | 4700048 | | 3/2011 | ............. F04B 49/00 |
| JP | 5167121 | | 12/2012 | ............. F04B 27/14 |
| JP | 2014-118939 | | 6/2014 | ............. F04B 27/14 |
| JP | 5557901 | | 6/2014 | ............. F04B 27/14 |
| JP | 2014-190247 | | 10/2014 | ............. F04B 27/14 |
| JP | 2016-196876 | | 11/2016 | ............. F04B 27/18 |
| JP | 2017-129042 | | 7/2017 | ............. F04B 27/18 |
| JP | 6206274 | | 10/2017 | ............. F04B 27/18 |
| JP | 2017-223348 | | 12/2017 | ............. F16K 11/10 |
| JP | 2018-21646 | | 2/2018 | ............. F16K 31/06 |
| JP | 2018-40385 | | 3/2018 | ............. F16K 31/06 |
| JP | 2018-145877 | | 9/2018 | ............. F04B 39/14 |
| JP | 2019-2384 | | 1/2019 | ............. F04B 27/18 |
| WO | WO 2007/119380 | | 10/2007 | ............. F04B 27/14 |
| WO | WO2011021789 | | 2/2011 | ............. F04B 27/14 |
| WO | WO2011135911 | | 11/2011 | ............. F04B 27/14 |
| WO | WO2013109005 | | 7/2013 | ............. F04B 49/06 |
| WO | WO2013176012 | | 11/2013 | ............. F04B 27/14 |
| WO | WO 2014/091975 | | 6/2014 | ............. F04B 27/14 |
| WO | WO 2014/119594 | | 8/2014 | ............. F04B 27/14 |
| WO | WO2016104390 | | 6/2016 | ............. F16K 31/06 |
| WO | WO 2017/057160 | | 4/2017 | ............. F04B 27/18 |
| WO | WO 2017/159553 | | 9/2017 | ............. F04B 27/18 |
| WO | WO2018207461 | | 11/2018 | ............. F04B 27/18 |
| WO | WO2019167912 | | 9/2019 | ............. F04B 27/18 |

OTHER PUBLICATIONS

International Preliminary Report on Patentability issued in PCT/JP2019/043374, dated May 11, 2021, 4 pages.
International Search Report and Written Opinion issued in PCT/JP2019/047192, dated Jun. 11, 2020, with English translation, 15 pages.
International Preliminary Report on Patentability issued in PCT/JP2019/047192, dated Jun. 8, 2021, 4 pages.
International Search Report and Written Opinion issued in PCT/JP2020/001443, dated Mar. 31, 2020, with English translation, 15 pages.
International Preliminary Report on Patentability issued in PCT/JP2020/001443, dated Jul. 29, 2021, 8 pages.
International Search Report and Written Opinion issued in PCT/JP2020/007953, dated Apr. 7, 2020, with English translation, 17 pages.
International Preliminary Report on Patentability issued in PCT/JP2020/007953, dated Sep. 16, 2021, 10 pages.
International Search Report and Written Opinion issued in PCT/JP2020/015181, dated Jun. 16, 2020, with English translation, 11 pages.
International Preliminary Report on Patentability issued in PCT/JP2020/015181, dated Oct. 14, 2021, 5 pages.
International Search Report and Written Opinion issued in PCT/JP2020/015175, dated Jun. 23, 2020, with English translation, 13 pages.
International Preliminary Report on Patentability issued in PCT/JP2020/015175, dated Oct. 14, 2021, 6 pages.
US Official Action issued in related U.S. Appl. No. 17/259,138, dated Jan. 19, 2022, 14 pages.
Notice of Allowance issued in related U.S. Appl. No. 17/287,086, dated Feb. 2, 2022, 7 pages.
U.S. Appl. No. 17/259,138, filed Jan. 8, 2021, Hayama et al.
U.S. Appl. No. 17/258,708, filed Jan. 7, 2021, Hayama et al.
U.S. Appl. No. 17/258,692, filed Jan. 7, 2021, Hayama et al.
U.S. Appl. No. 17/256,947, filed Dec. 29, 2020, Hayama et al.
U.S. Appl. No. 17/256,959, filed Dec. 29, 2020, Hayama, et al.
U.S. Appl. No. 17/256,953, filed Dec. 29, 2020, Hayama et al.
U.S. Appl. No. 17/056,988, filed Nov. 19, 2020, Kurihara et al.
U.S. Appl. No. 16/969,175, filed Aug. 11, 2020, Kurihara et al.
U.S. Appl. No. 16/967,693, filed Aug. 5, 2020, Hayama et al.
U.S. Appl. No. 16/967,692, filed Aug. 5, 2020, Hayama et al.

(56) References Cited

OTHER PUBLICATIONS

U.S. Appl. No. 16/962,786, filed Jul. 16, 2020, Hayama et al.
International Search Report and Written Opinion issued in PCT/JP2019/002207, dated Apr. 23, 2019, with English translation, 13 pages.
International Preliminary Report on Patentability issued in PCT/JP2019/002207, dated Jul. 28, 2020, 7 pages.
International Search Report and Written Opinion issued in PCT/JP2019/005200, dated Apr. 23, 2019, with English translation, 12 pages.
International Preliminary Report on Patentability issued in PCT/JP2019/005200, dated Aug. 18, 2020, 7 pages.
International Search Report and Written Opinion issued in PCT/JP2019/007187, dated Apr. 23, 2019, with English translation, 16 pages.
International Preliminary Report on Patentability issued in PC17JP2019/007187, dated Sep. 3, 2020, 8 pages.
International Search Report and Written Opinion issued in PCT/JP2019/020196, dated Aug. 27, 2019, with English translation, 11 pages.
International Preliminary Report on Patentability issued in PCT/JP2019/020196, dated Nov. 24, 2020, with English translation, 6 pages.
International Search Report and Written Opinion issued in PCT/JP2019/005199, dated Apr. 23, 2019, with English translation, 12 pages
International Preliminary Report on Patentability issued in PCT/JP2019/005199, dated Aug. 18, 2020, 4 pages.
International Search Report and Written Opinion issued in PCT/JP2019/027112, dated Oct. 15, 2019, with English translation, 10 pages.
International Preliminary Report on Patentability issued in PCT/JP2019/027112, dated Jan. 19, 2021, 4 pages.
International Search Report and Written Opinion issued in PCT/JP2019/027071, dated Oct. 15, 2019, with English translation, 12 pages.
International Preliminary Report on Patentability issued in PCT/JP2019/027071, dated Jan. 12, 2021, 4 pages.
International Search Report and Written Opinion issued in PCT/JP2019/027072, dated Oct. 8, 2019, with English translation, 10 pages.
International Preliminary Report on Patentability issued in PCT/JP2019/027072, dated Jan. 12, 2021, 4 pages.
International Search Report and Written Opinion issued in PCT/JP2019/027073, dated Oct. 15, 2019, with English translation, 10 pages.
International Preliminary Report on Patentability issued in PCT/JP2019/027073, dated Jan. 12, 2021, 4 pages.
International Search Report and Written Opinion issued in PCT/JP2019/031067, dated Oct. 15, 2019, with English translation, 18 pages.
International Preliminary Report on Patentability issued in PCT/JP2019/031067, dated Feb. 9, 2021, 6 pages.
International Search Report and Written Opinion issued inPCT/JP2019/031068, dated Oct. 15, 2019, with English translation, 13 pages.
International Preliminary Report on Patentability issued in PCT/JP2019/031068, dated Feb. 9, 2021, 5 pages.
International Search Report and Whitten Opinion issued in PCT/JP2019/031069, dated Oct. 15, 2019, with English translation, 12 pages.
International Preliminary Report on Patentability issued in PCT/JP2019/031069, dated Feb. 9, 2021, 4 pages.
US Official Action issued in related U.S. Appl. No. 17/299,285, dated Mar. 31, 2022, 11 pages.
Chinese Official Action issued in related application serial No. 201980046750.3, dated Apr. 27, 2022, with translation, 10 pages.
Chinese Official Action issued in related application serial No. 201980047614.6, dated Apr. 26, 2022, with translation, 9 pages.
European Search Report issued in related application serial No. 19833028.4, dated Apr. 7, 2022, 8 pages.
European Search Report issued in related application serial No. 19894059.5, dated Jun. 7, 2022, 4 pages.
European Search Report issued in related application serial No. 19883193.5, dated May 23, 2022, 5 pages.
US Official Action issued in related U.S. Appl. No. 17/256,959, dated May 5, 2022, 18 pages.
Chinese Official Action issued in related application serial No. 201980044138.2, dated Mar. 30, 2022, with translation, 9 pages.
Chinese Official Action issued in related application serial No. 201980044077.x, dated Apr. 2, 2022, with translation, 11 pages.
Chinese Official Action issued in related application serial No. 201980046798.4, dated Apr. 6, 2022, with translation, 8 pages.
European Search Report issued in related application serial No. 19848099.8, dated Feb. 9, 2022, 7 pages.
European Search Report issued in related application serial No. 19834984.7, dated Feb. 21, 2022, 12 pages.
European Search Report issued in related application serial No. 19833331.2, dated Mar. 30, 2022, 6 pages.
European Search Report issued in related application serial No. 19847690.5, dated Feb. 9, 2022, 5 pages.
European Search Report issued in related application serial No. 19847395.1, dated Feb. 9, 2022, 5 pages.
European Search Report issued in related application serial No. 19834556.3, dated Feb. 17, 2022, 7 pages.
US Official Action issued in related U.S. Appl. No. 17/256,953, dated Apr. 15, 2022, 18 pages.
US Official Action issued in related U.S. Appl. No. 17/259,138, dated Mar. 31, 2022, 5 pages.
US Official Action issued in related U.S. Appl. No. 17/256,955, dated Feb. 18, 2022, 19 pages.
U.S. Appl. No. 17/256,953, filed Dec. 29, 2020.
U.S. Appl. No. 17/299,285, filed Jun. 2, 2021.
U.S. Appl. No. 17/256,959, filed Dec. 29, 2020.
U.S. Appl. No. 17/287,086, filed Apr. 20, 2021.
U.S. Appl. No. 17/417,701, filed Jun. 23, 2021.
U.S. Appl. No. 17/258,692, filed Jan. 7, 2021.
U.S. Appl. No. 17/256,955, filed Dec. 29, 2020.
U.S. Appl. No. 17/433,558, filed Aug. 24, 2021.
U.S. Appl. No. 17/256,947, filed Dec. 29, 2020.
U.S. Appl. No. 17/258,708, filed Jan. 7, 2021.
U.S. Appl. No. 17/259,138, filed Jan. 8, 2021.
U.S. Appl. No. 17/600,547, filed Sep. 30, 2021.
U.S. Appl. No. 17/599,539, filed Sep. 28, 2021.
Chinese Official Action issued in related application serial No. 202080016397.7, dated Aug. 3, 2022, with translation, 10 pages.
Chinese Official Action issued in related application serial No. 202080007416.X, dated Jul. 28, 2022, with translation, 9 pages.
European Offical Action issued in related application serial No. 19883193.5, dated May 23, 2022, 5 pages.
US Official Action issued in related U.S. Appl. No. 17/433,558, dated May 25, 2022, 11 pages.

\* cited by examiner

CAPACITY CONTROL VALVE

TECHNICAL FIELD

The present invention relates to a capacity control valve for variably controlling a capacity of a working fluid and relates to, for example, a capacity control valve for controlling a discharge amount of a variable displacement compressor used in an air conditioning system of an automobile in response to a pressure.

BACKGROUND ART

A variable displacement compressor used in an air conditioning system of an automobile or the like includes a rotating shaft rotationally driven by an engine, a swash plate connected to the rotating shaft so that an inclination angle is variable, a compression piston connected to the swash plate, and the like and changes the inclination angle of the swash plate so that a stroke amount of the piston is changed to control a discharge amount of a fluid. The inclination angle of the swash plate can be changed continuously by appropriately controlling a pressure inside a control chamber, by using a capacity control valve driven to be opened and closed by an electromagnetic force, while using a suction pressure Ps of a suction chamber sucking a fluid, a discharge pressure Pd of a discharge chamber discharging a fluid pressurized by the piston, and a control pressure Pc of the control chamber accommodating the swash plate.

When the variable displacement compressor is driven continuously (hereinafter, simply referred to as a "continuous driving state"), the capacity control valve is energized and controlled by a control computer and performs normal control in which a valve body is moved in the axial direction by an electromagnetic force generated in a solenoid and a primary valve is opened and closed so as to adjust a control pressure Pc of the control chamber of the variable displacement compressor.

During normal control of the capacity control valve, the pressure of the control chamber of the variable displacement compressor is appropriately controlled and the inclination angle of the swash plate with respect to the rotating shaft is continuously changed to change the stroke amount of the piston so that the discharge amount of the fluid with respect to the discharge chamber is controlled and the air conditioning system is adjusted to have desired cooling capacity. Further, when the variable displacement compressor is driven with a maximum capacity, the primary valve of the capacity control valve is closed so as to decrease the pressure of the control chamber. Accordingly, the inclination angle of the swash plate becomes maximal.

Further, there is known a method of improving responsiveness of the variable displacement compressor by forming an auxiliary communication path which communicates a control port and a suction port of the capacity control valve with each other, discharging a refrigerant of the control chamber of the variable displacement compressor to the suction chamber of the variable displacement compressor through the control port, the auxiliary communication path, and the suction port at startup, and promptly decreasing the pressure of the control chamber at startup (see Patent Citation 1).

CITATION LIST

Patent Literature

Patent Citation 1: JP 5167121 B2 (Page 7, FIG. 2)

SUMMARY OF INVENTION

Technical Problem

However, in Patent Citation 1, the fluid discharge function is excellent at startup. However, when the energizing of the capacity control valve is controlled in the continuous driving state of the variable displacement compressor, the auxiliary communication path is in a communication state so that a refrigerant flows from the control port to the suction port. As a result, there is concern that the controllability of the pressure of the control chamber is poor and the operation efficiency of the variable displacement compressor is deteriorated.

The present invention has been made in view of such problems and an object of the present invention is to provide a capacity control valve having good operation efficiency while having a fluid discharge function at startup.

Solution to Problem

In order to solve the foregoing problems, a capacity control valve according to the present invention is a capacity control valve including; a valve housing provided with a discharge port allowing a discharge fluid of a discharge pressure to pass therethrough, a suction port allowing a suction fluid of a suction pressure to pass therethrough, and a control port allowing a control fluid of a control pressure to pass therethrough; a primary valve including a primary valve seat and a primary valve body driven by a solenoid, the primary valve being configured to open and close a communication between the discharge port and the control port in accordance with a movement of the primary valve body; a differential CS valve that is openable and closable by a pressure difference between the control pressure and the suction pressure; and an electromagnetic CS valve that is openable and closable so as to close the control port and the suction port in a non-energized state of the solenoid in accordance with the movement of the primary valve body. According to the aforesaid feature, since the differential CS valve is opened so that the control port communicates with the suction port when starting the variable displacement compressor, the responsiveness at startup can be improved by discharging a liquefied fluid in the control chamber into the suction chamber through the differential CS valve in a short time. Further, in a normal control state in which the solenoid of the capacity control valve is energized, the differential CS valve is closed by a differential pressure so that the control fluid passing through the control port does not flow into the suction port. Then, in the non-energized state of the solenoid, the electromagnetic CS valve is closed so that the control fluid passing through the control port does not flow into the suction port. For this reason, the operation efficiency of the capacity control valve is high.

It may be preferable that a differential CS valve body of the differential CS valve partially constitutes an electromagnetic CS valve seat of the electromagnetic CS valve. According to this configuration, since the differential CS valve body partially constitutes the electromagnetic CS valve seat, the capacity control valve has a simple structure.

It may be preferable that the differential CS valve includes in addition to the cylindrical differential CS valve body of a cylindrical shape, a differential CS spring which urges the differential CS valve body in a valve opening direction. According to this configuration, the capacity control valve with the differential CS valve has a simple structure.

It may be preferable that the valve housing is provided with a movement regulation portion configured to regulate a movement of the differential CS valve body due to an urge of the differential CS spring. According to this configuration, the electromagnetic CS valve seat formed in the differential CS valve can be reliably located at a predetermined position by the differential CS spring in the non-energized state of the solenoid.

It may be preferable that the electromagnetic CS valve includes an electromagnetic CS valve body and an electromagnetic CS spring configured to urge the electromagnetic CS valve body in a valve closing direction. According to this configuration, the electromagnetic CS valve can be reliably closed by the electromagnetic CS spring in the non-energized state of the solenoid.

It may be preferable that the capacity control valve further includes a pressure drive valve which is opened and closed in accordance with the suction pressure, the primary valve body constitutes a part of a hollow rod provided with a hollow communication path capable of communicating the control port with the suction port by opening and closing the pressure drive valve. According to this configuration, since a refrigerant can be discharged also by the pressure drive valve at the startup, the refrigerant can be promptly discharged.

It may be preferable that the suction port includes a first suction port and a second suction port and the first suction port, the discharge port, the control port, and the second suction port are sequentially disposed from a side of the solenoid. According to this configuration, since the control port and the second suction port are adjacent to each other, the capacity control valve with the differential CS valve and the electromagnetic CS valve has a simple structure.

DESCRIPTION OF EMBODIMENTS

Modes for implementing a capacity control valve according to the present invention will be described on the basis of embodiments.

First Embodiment

A capacity control valve according to a first embodiment of the present invention will be described with reference to FIGS. 1 to 5. Hereinafter, the left and right sides as viewed from the front side in FIG. 2 will be described as the left and right sides of the capacity control valve.

A capacity control valve V of the present invention is incorporated in a variable displacement compressor M used in an air conditioning system of an automobile or the like and variably controls a pressure of a working fluid (hereinafter, simply referred to as a "fluid") which is a refrigerant so that a discharge amount of the variable displacement compressor M is controlled to adjust the air conditioning system to a desired cooling capacity.

Figure 1:
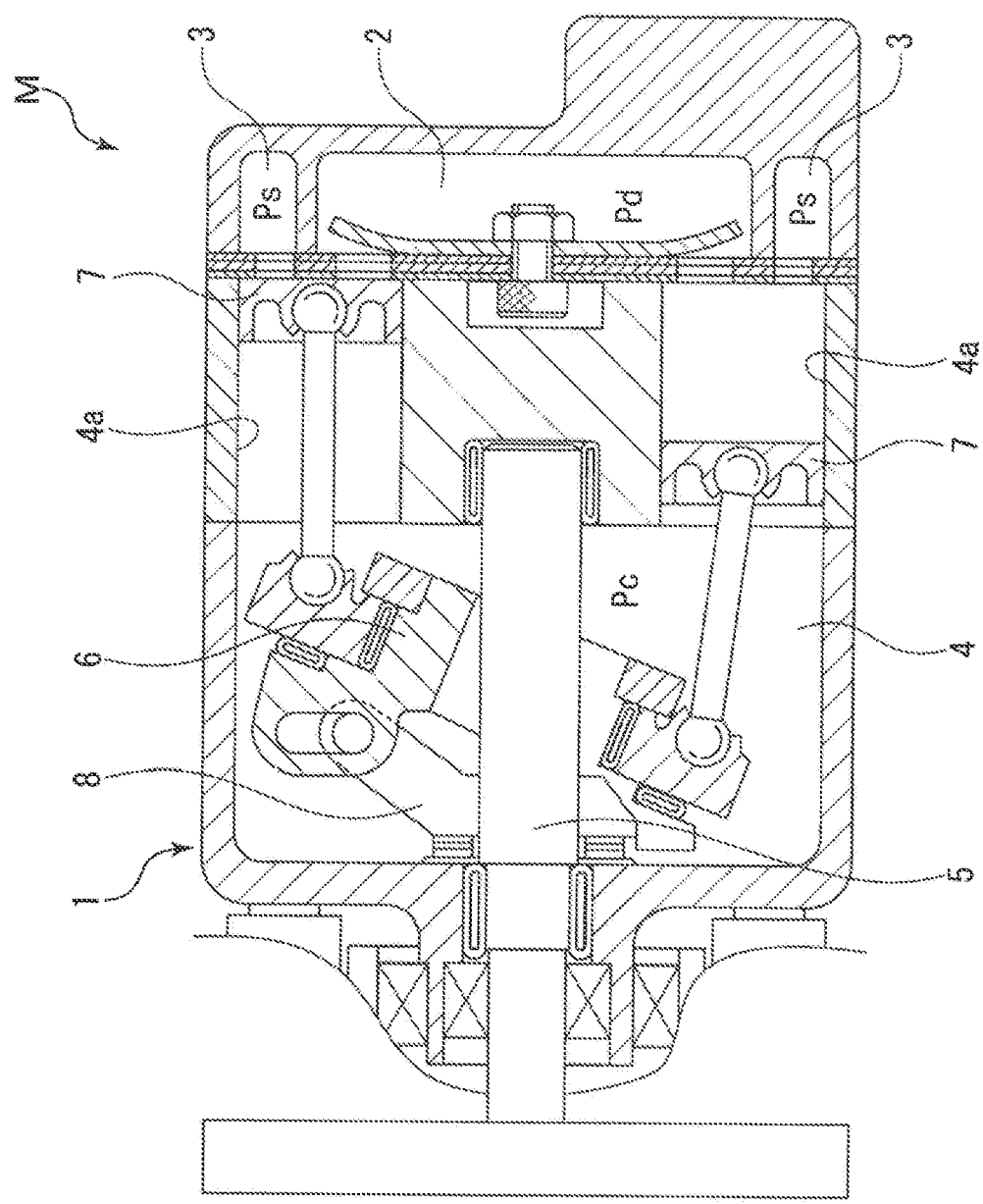
FIG. 1 is a schematic configuration diagram illustrating a swash plate type variable displacement compressor incorporated with a capacity control valve according to a first embodiment of to the present invention.

First, the variable displacement compressor M will be described. As illustrated in FIG. 1, the variable displacement compressor M includes a casing 1 having a discharge chamber 2, a suction chamber 3, a control chamber 4, and a plurality of cylinders 4a. In addition, the variable displacement compressor M is provided with a communication path (not illustrated) allowing the control chamber 4 and the suction chamber 3 to directly communicate with each other and this communication path is provided with a fixed orifice for adjusting a pressure between the suction chamber 3 and the control chamber 4 in a balanced state.

Further, the variable displacement compressor M includes a rotating shaft 5 which is rotationally driven by an engine (not illustrated) installed outside the casing 1, a swash plate 6 which is eccentrically connected to the rotating shaft 5 inside the control chamber 4 by a hinge mechanism 8, and a plurality of pistons 7 which are connected to the swash plate 6 and are fitted so as to be movable in a reciprocating manner inside the respective cylinders 4a and continuously changes an inclination angle of the swash plate 6 by appropriately controlling a pressure inside the control chamber 4, by using the capacity control valve V driven to be opened and closed by an electromagnetic force, while using a suction pressure Ps of the suction chamber 3 sucking a fluid, a discharge pressure Pd of the discharge chamber 2 discharging a fluid pressurized by the piston 7, and a control pressure Pc of the control chamber 4 accommodating the swash plate 6 so that a stroke amount of the piston 7 is changed to control a discharge amount of the fluid. Further, for convenience of description, the capacity control valve V incorporated in the variable displacement compressor M is omitted in FIG. 1.

Specifically, the inclination angle of the swash plate 6 with respect to the rotating shaft 5 becomes smaller so that the stroke amount of the piston 7 decreases as the control pressure Pc inside the control chamber 4 becomes higher. However, when the pressure becomes a certain level or more, the swash plate 6 is substantially perpendicular to the rotating shaft 5, that is, slightly inclined from the vertical state. At this time, since the stroke amount of the piston 7 is minimized and the pressurization of the fluid inside the cylinder 4a by the piston 7 is minimized, the discharge amount of the fluid to the discharge chamber 2 decreases and the cooling capacity of the air conditioning system is minimized. On the other hand, the inclination angle of the swash plate 6 with respect to the rotating shaft 5 becomes larger so that the stroke amount of the piston 7 increases as the control pressure Pc inside the control chamber 4 becomes lower. However, when the pressure becomes a certain level or less, the inclination angle of the swash plate 6 with respect to the rotating shaft 5 is maximized. At this time, since the stroke amount of the piston 7 is maximized and the pressurization of the fluid inside the cylinder 4a by the piston 7 is maximized, the discharge amount of the fluid to the discharge chamber 2 increases and the cooling capacity of the air conditioning system is maximized.

Figure 2:
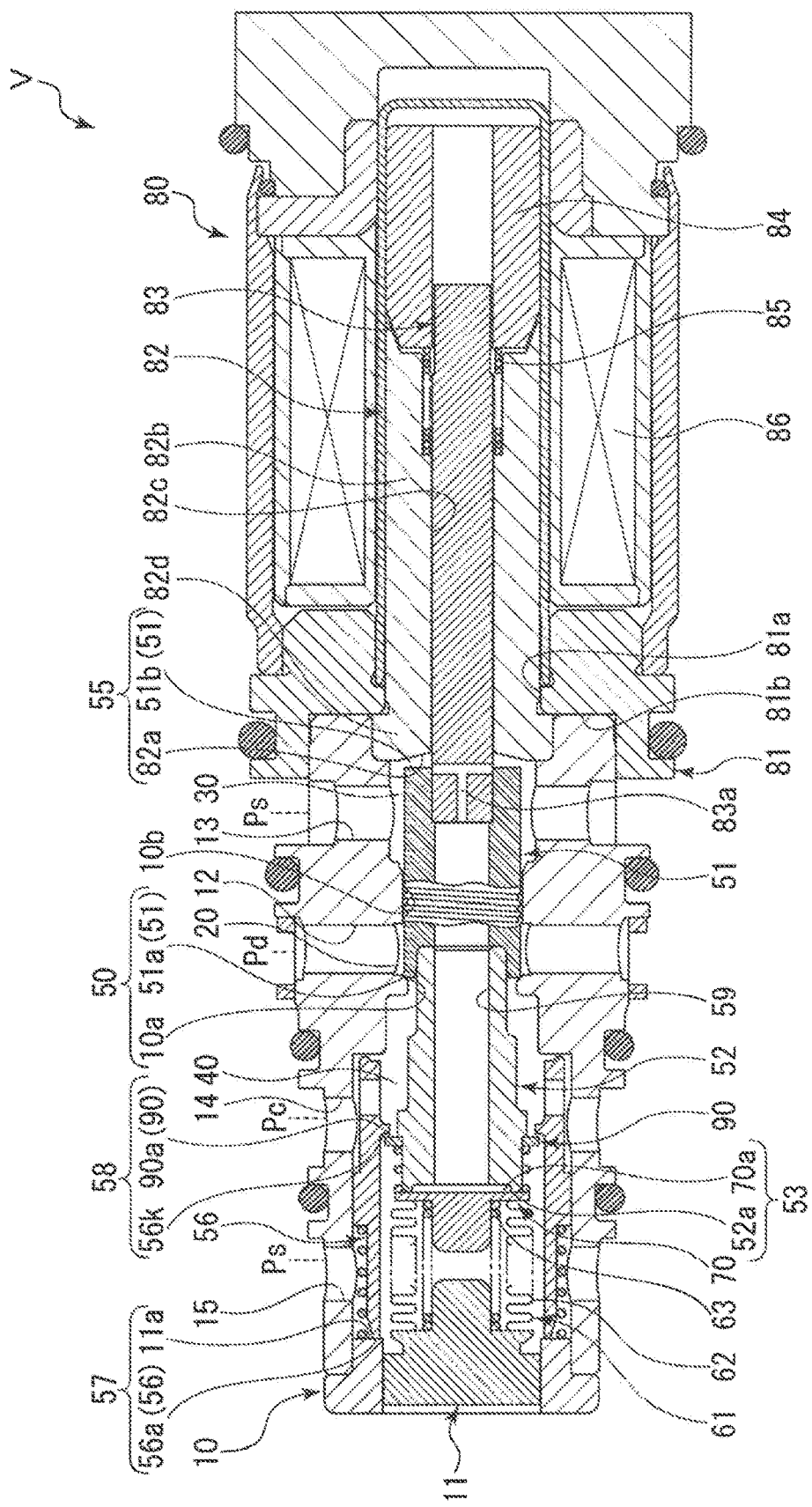
FIG. 2 is a cross-sectional view illustrating a case in which a primary valve is closed, a differential CS valve is closed, and an electromagnetic CS valve is opened in an energized state (e.g., a normal control state) of the capacity control valve of the first embodiment.

As illustrated in FIG. 2, the capacity control valve V incorporated in the variable displacement compressor M variably controls the control pressure Pc in the control chamber 4 by controlling the fluid flowing into the control chamber 4 or flowing out from the control chamber 4 in such a manner that a current flowing through a coil 86 constituting a solenoid 80 is adjusted to control the opening and closing of a primary valve 50, a sub-valve 55, and an electromagnetic CS valve 58 of the capacity control valve V and a pressure-sensitive body 61 is operated by the suction pressure Ps of an intermediate communication path 59 corresponding to a hollow communication path to control the opening and closing of a pressure-sensitive valve 53 corresponding to a pressure drive valve.

In the embodiment, the primary valve 50 includes a primary sub-valve body 51 which corresponds to a primary valve body and a hollow rod and a primary valve seat 10a formed on an inner peripheral surface of a valve housing 10 and the primary valve 50 is opened and closed when a left axial end 51a of the primary sub-valve body 51 is brought into contact with and separated from the primary valve seat 10a. The pressure-sensitive valve 53 includes a cap 70 constituting the pressure-sensitive body 61 and a pressure-sensitive valve seat 52a formed in a left axial end of a pressure-sensitive valve member 52 corresponding to the hollow rod and the pressure-sensitive valve 53 is opened and closed when a seal surface 70a formed on the outer radial side of the right axial end of the cap 70 is brought into contact with and separated from the pressure-sensitive valve seat 52a. The sub-valve 55 includes the primary sub-valve body 51 and a sub-valve seat 82a formed on the opening end surface of the fixed iron core 82, that is, the left axial end surface and the sub-valve 55 is opened and closed when a right axial end 51b of the primary sub-valve body 51 is brought into contact with and separated from the sub-valve seat 82a. The electromagnetic CS valve 58 includes an electromagnetic CS valve body 90 and an electromagnetic CS valve seat 56k formed on an inner peripheral surface of a differential CS valve body 56 and the electromagnetic CS valve 58 is opened and closed when a right axial end surface 90a of the electromagnetic CS valve body 90 is brought into contact with and separated from the electromagnetic CS valve seat 56k.

Next, the structure of the capacity control valve V will be described. As illustrated in FIG. 2, the capacity control valve V mainly includes the valve housing 10 which is formed of a metal material or a resin material, the primary sub-valve body 51, the pressure-sensitive valve member 52, the differential CS valve body 56, and the electromagnetic CS valve body 90 which are disposed in the valve housing 10 so as to be movable in a reciprocating manner in the axial direction, the pressure-sensitive body 61 which applies an urging force to the primary sub-valve body 51, the pressure-sensitive valve member 52, and the electromagnetic CS valve body 90 rightward in the axial direction in response to the suction pressure Ps of the intermediate communication path 59, and the solenoid 80 which is connected to the valve housing 10 and applies a drive force to the primary sub-valve body 51, the pressure-sensitive valve member 52, and the electromagnetic CS valve body 90.

As illustrated in FIG. 2, the solenoid 80 mainly includes a casing 81 which includes an opening portion 81a opening to the left side in the axial direction, a substantially cylindrical fixed iron core 82 which is inserted into the opening portion 81a of the casing 81 from the left side in the axial direction and is fixed to the inner radial side of the casing 81, a drive rod 83 which is disposed on the inner radial side of the fixed iron core 82 so as to be movable in a reciprocating manner in the axial direction so that the left axial end portion is connected and fixed to a right axial end portion of the primary sub-valve body 51, a movable iron core 84 which is fixed to the right axial end portion of the drive rod 83, a coil spring 85 which is provided between the fixed iron core 82 and the movable iron core 84 and urges the movable iron core 84 rightward in the axial direction, and an excitation coil 86 which is wound on the outside of the fixed iron core 82 with a bobbin interposed therebetween.

The casing 81 is provided with a concave portion 81b of which an inner radial side of a left axial end is recessed rightward in the axial direction and a right axial end portion of the valve housing 10 is inserted and fixed to the concave portion 81b in a substantially sealed state.

The fixed iron core 82 is formed of a rigid body corresponding to a magnetic material such as iron or silicon steel and includes a cylindrical portion 82b which is provided with an insertion hole 82c extending in the axial direction so that the drive rod 83 is inserted therethrough and an annular flange portion 82d which extends outward in the radial direction from the outer peripheral surface of the left axial end portion of the cylindrical portion 82b and a sub-valve seat 82a is formed on a left axial end surface of the cylindrical portion 82b.

As illustrated in FIG. 2, the valve housing 10 is provided with a Pd port 12 which corresponds to a discharge port communicating with the discharge chamber 2 of the variable displacement compressor M, a first Ps port 13 which corresponds to a suction port and a first suction port communicating with the suction chamber 3 of the variable displacement compressor M, a Pc port 14 which corresponds to a control port communicating with the control chamber 4 of the variable displacement compressor M, and a second Ps port 15 which corresponds to a suction port and a second suction port communicating with the suction chamber 3 of the variable displacement compressor M and the first Ps port 13, the Pd port 12, the Pc port 14, and the second Ps port 15 are sequentially provided from the side of the solenoid 80.

Further, the valve housing 10 is formed in a bottomed cylindrical shape by press-inserting a partition adjustment member 11 into the left axial end portion in a substantially sealed state. Additionally, the partition adjustment member 11 can adjust the urging force of the pressure-sensitive body 61 by adjusting the installation position of the valve housing 10 in the axial direction.

The primary sub-valve body 51, the pressure-sensitive valve member 52, the differential CS valve body 56, and the electromagnetic CS valve body 90 are disposed in the valve housing 10 so as to be movable in a reciprocating manner in the axial direction and a part of the inner peripheral surface of the valve housing 10 is provided with a small-diameter guide surface 10b on which the outer peripheral surface of the primary sub-valve body 51 is slidable in a substantially sealed state.

Further, a first valve chamber 20 which communicates with the Pd port 12 and in which the side of the left axial end 51a of the primary sub-valve body 51 is disposed, a second valve chamber 30 which communicates with the first Ps port 13 and in which the back pressure side of the primary sub-valve body 51, that is, the side of the right axial end 51b is disposed, and a pressure-sensitive chamber 40 which communicates with the Pc port 14 and the second Ps port 15 and in which the differential CS valve body 56 and the electromagnetic CS valve body 90 are disposed along with the pressure-sensitive body 61 are formed in the valve housing 10. Additionally, the second valve chamber 30 is defined by the outer peripheral surface of the primary sub-valve body 51, the left axial end surface of the fixed iron core 82, and the inner peripheral surface on the right side of the guide surface 10b of the valve housing 10 in the axial direction.

As illustrated in FIG. 2, the pressure-sensitive body 61 mainly includes a bellows core 62 which has a coil spring 63 embedded therein and the disk-shaped cap 70 which is provided in the right axial end of the bellows core 62 and the left axial end of the bellows core 62 is fixed to the partition adjustment member 11.

Further, the pressure-sensitive body 61 is disposed in the pressure-sensitive chamber 40 and the seal surface 70a of the cap 70 sits on the pressure-sensitive valve seat 52a of the pressure-sensitive valve member 52 by an urging force of moving the cap 70 rightward in the axial direction by the coil spring 63 and the bellows core 62.

Figure 3:
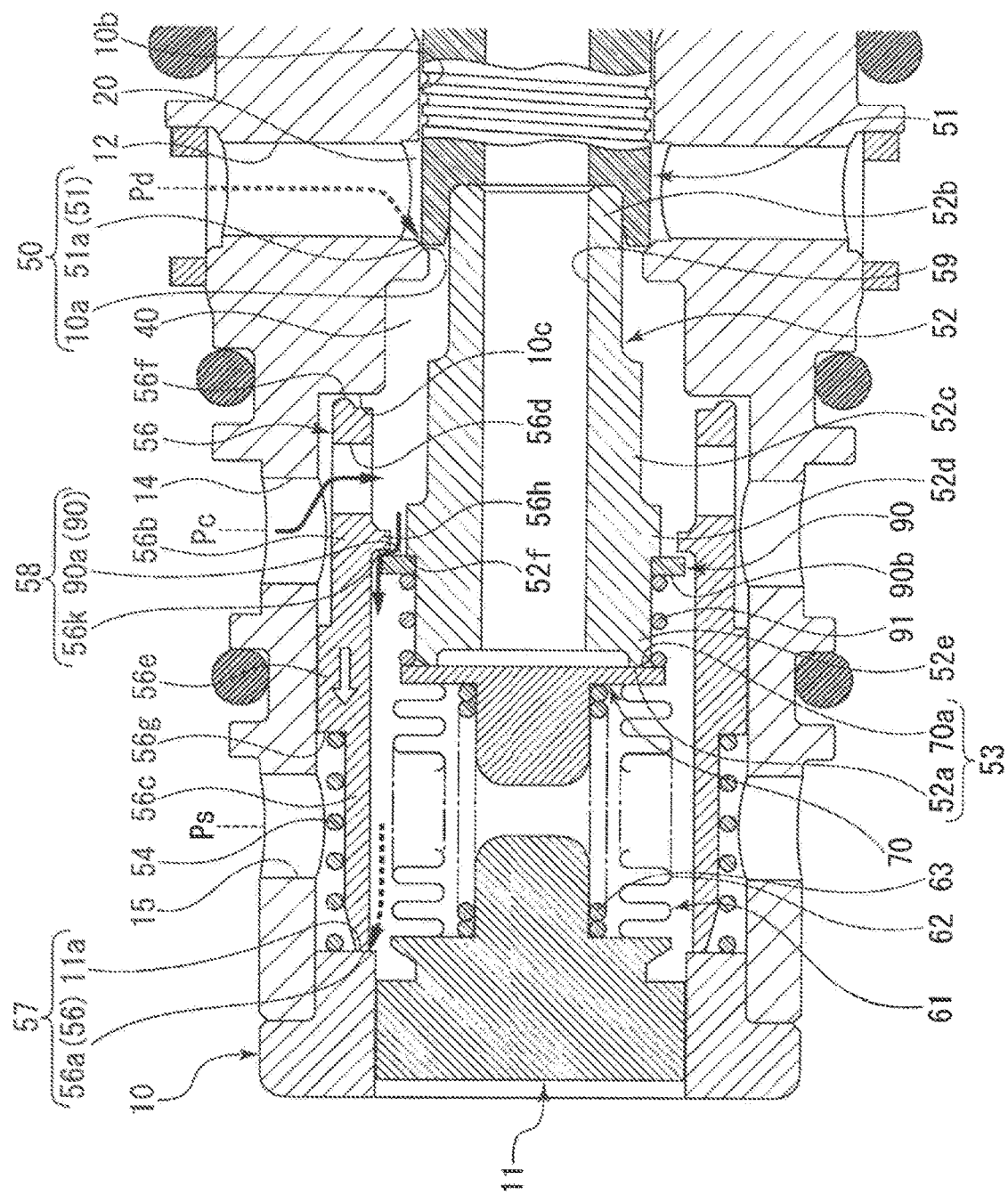
FIG. 3 is an enlarged cross-sectional view of FIG. 2 illustrating a case in which the primary valve is closed, the differential CS valve is closed, and the electromagnetic CS valve is opened in the energized state (e.g., the normal control state) of the capacity control valve of the first embodiment.

As illustrated in FIGS. 2 and 3, the primary sub-valve body 51 is formed in a substantially cylindrical shape, the pressure-sensitive valve member 52 is connected and fixed to the left axial end portion, the drive rod 83 is connected and fixed to the right axial end portion, and these members are movable in the axial direction together. Additionally, the outer peripheral surface of the primary sub-valve body 51 and the guide surface 10b of the valve housing 10 are slightly separated from each other in the radial direction so that a minute gap is formed and the primary sub-valve body 51 slides on the valve housing 10 so as to be smoothly and relatively movable in the axial direction.

Further, the intermediate communication path 59 which penetrates in the axial direction is formed in the primary sub-valve body 51 and the pressure-sensitive valve member 52 by connecting hollow holes. Additionally, the intermediate communication path 59 can communicate with the second valve chamber 30 through a communication hole 83a formed in the left axial end portion of the drive rod 83 (see FIG. 2). In addition, for convenience of description, although not illustrated in the drawings, there is a case in which a high-pressure fluid is liquefied in the control chamber 4 when the variable displacement compressor M is stopped and is left for a long time. However, when the variable displacement compressor M is started and the capacity control valve V is energized, the primary valve 50 is closed and the sub-valve 55 is opened so that the pressure-sensitive body 61 is contracted and the pressure-sensitive valve 53 is opened due to the high suction pressure Ps in the intermediate communication path 59. Accordingly, the liquid refrigerant of the control chamber 4 can be discharged to the suction chamber 3 in a short time through the intermediate communication path 59.

As illustrated in FIG. 3, the pressure-sensitive valve member 52 is formed in a substantially cylindrical shape including a first cylindrical portion 52b which is connected and fixed to the left axial end portion of the primary sub-valve body 51, a second cylindrical portion 52c which is formed on the left side of the first cylindrical portion 52b in the axial direction so as to have a diameter larger than that of the first cylindrical portion 52b, an annular convex portion 52d which is formed on the left side of the second cylindrical portion 52c in the axial direction so as to have a diameter larger than that of the second cylindrical portion 52c, and a contact portion 52e which is formed on the left side of the annular convex portion 52d in the axial direction so as to have a diameter smaller than that of the annular convex portion 52d and is provided with the pressure-sensitive valve seat 52a brought into contact with and separated from the seal surface 70a of the cap 70 constituting the pressure-sensitive body 61. Further, the electromagnetic CS valve body 90 and a coil spring 91 corresponding to an electromagnetic CS spring are externally fitted to the contact portion 52e of the pressure-sensitive valve member 52.

As illustrated in FIG. 3, the electromagnetic CS valve body 90 is formed in an annular plate shape and the radial dimension is set so that the electromagnetic CS valve body protrudes outward in the radial direction in relation to the annular convex portion 52d of the pressure-sensitive valve member 52 while being externally fitted to the contact portion 52e of the pressure-sensitive valve member 52. Additionally, the inner peripheral surface of the electromagnetic CS valve body 90 and the outer peripheral surface of the contact portion 52e of the pressure-sensitive valve member 52 are separated from each other in the radial direction so that a gap is formed and the electromagnetic CS valve body 90 and the pressure-sensitive valve member 52 are smoothly and relatively movable in the axial direction by the sliding.

Further, the left axial end of the coil spring 91 is fixed to the outer radial portion of the seal surface 70a of the cap 70 constituting the pressure-sensitive body 61 and the right axial end of the coil spring 91 is fixed to a left axial side surface 90b of the electromagnetic CS valve body 90. That is, the electromagnetic CS valve body 90 is urged rightward in the axial direction by the coil spring 91 and is held while the inner radial portion of the right axial end surface 90a of the electromagnetic CS valve body 90 is brought into contact with a left axial side surface 52f of the annular convex portion 52d of the pressure-sensitive valve member 52. Additionally, the coil spring 91 is a compression spring.

Next, the opening and closing mechanism of the electromagnetic CS valve 58 will be described. When the primary valve 50 is closed in the energized state of the solenoid 80, the outer radial portion of the right axial end surface 90a of the electromagnetic CS valve body 90 is separated in the axial direction from the electromagnetic CS valve seat 56k formed on the left side of an inward annular convex portion 56h of the differential CS valve body 56 in the axial direction so that the electromagnetic CS valve 58 is opened (see FIGS. 3 and 4).

Figure 5:
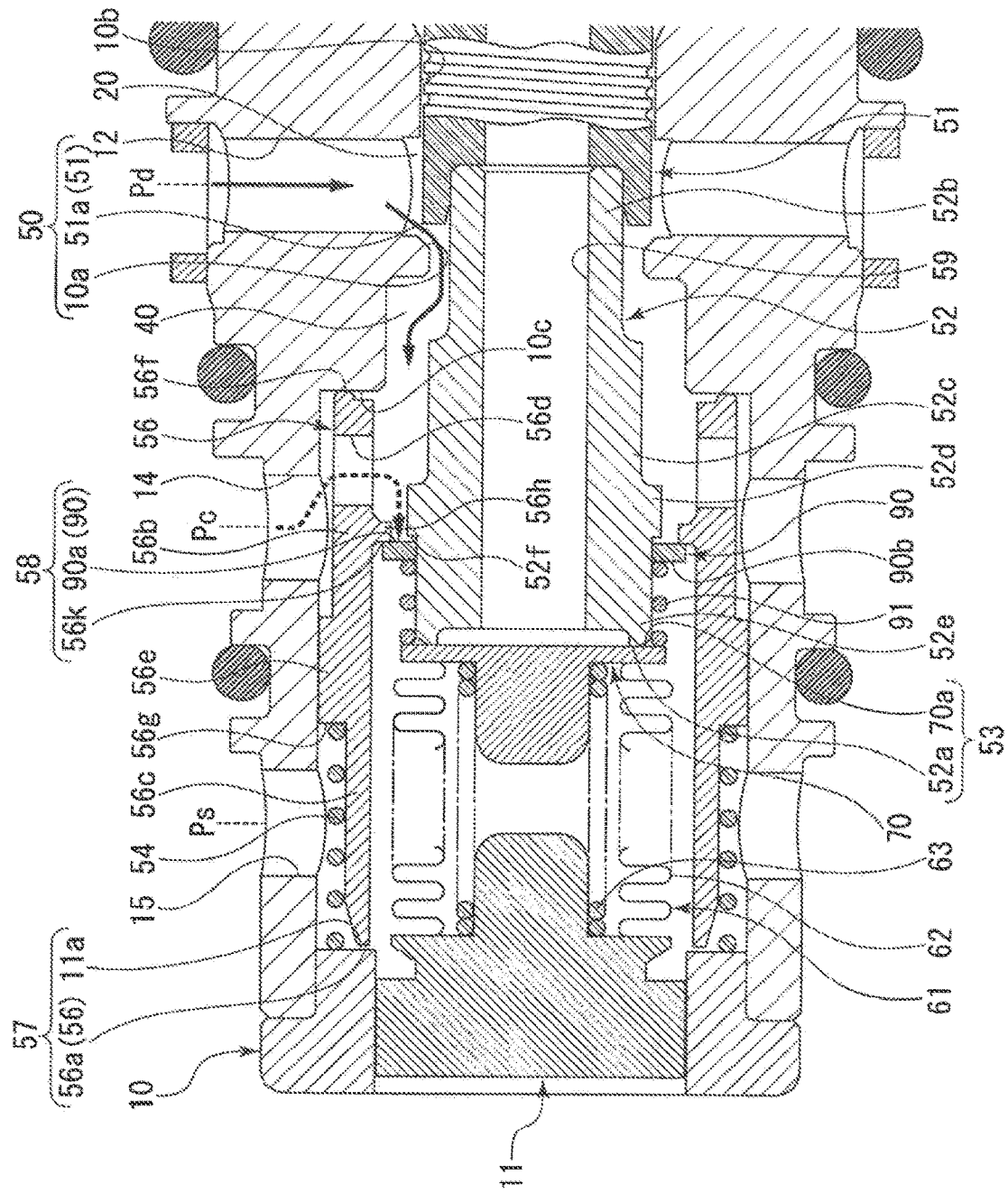
FIG. 5 is an enlarged cross-sectional view illustrating a case in which the primary valve is opened and the electromagnetic CS valve is closed while the differential CS valve is maintained to be opened in a non-energized state of the capacity control valve of the first embodiment.

On the other hand, when the primary valve 50 is opened in the non-energized state of the solenoid 80, the outer radial portion of the right axial end surface 90a of the electromagnetic CS valve body 90 is brought into contact with the electromagnetic CS valve seat 56k of the differential CS valve body 56 in the axial direction so that the electromagnetic CS valve 58 is closed (see FIG. 5). Additionally, the electromagnetic CS valve 58 is not limited to one that perfectly blocks a gap between the right axial end surface 90a of the electromagnetic CS valve body 90 and the electromagnetic CS valve seat 56k of the differential CS valve body 56 and may be configured to throttle the flow of the fluid from the Pc port 14 toward the second Ps port 15.

Next, the differential CS valve 57 will be described. The differential CS valve 57 includes the differential CS valve body 56 and the differential CS valve seat 11a formed on the right axial end surface of the partition adjustment member 11 and the left axial end 56a of the differential CS valve body 56 is brought into contact with and separated from the differential CS valve seat 11a.

As illustrated in FIG. 3, the differential CS valve body 56 is formed in a substantially cylindrical shape and is concentrically disposed on the outer radial side of the pressure-sensitive body 61 and the pressure-sensitive valve member 52 in the pressure-sensitive chamber 40. Further, a coil spring 54 corresponding to a differential CS spring is externally fitted to a small-diameter attachment portion 56c formed in the left axial end portion of the differential CS valve body 56, the left axial end of the coil spring 54 is brought into contact with the right axial end surface of the partition adjustment member 11, and the right axial end of the coil spring 54 is brought into contact with a side surface 56g extending toward the outside of the right axial end of the attachment portion 56c in the radial direction. Additionally, the outer periphery of the coil spring 54 is separated from the inner peripheral surface of the valve housing 10 in the radial direction.

Specifically, the differential CS valve body 56 includes a substantially cylindrical base portion 56b, the small-diameter attachment portion 56c which is formed in the left axial end portion of the base portion 56b, a through-hole 56d which is formed in the right axial end portion of the base portion 56b so as to penetrate in the radial direction, an outward annular convex portion 56e which is formed on the left side of the through-hole 56d in the axial direction so as to protrude outward in the radial direction from the outer peripheral surface of the base portion 56b, and the inward annular convex portion 56h which is formed on the left side of the through-hole 56d in the axial direction and protrudes inward in the radial direction from the inner peripheral surface of the base portion 56b and is urged in the rightward axial direction corresponding to the valve opening direction of the differential CS valve 57 by the coil spring 54 externally fitted to the attachment portion 56c. Additionally, the through-hole 56d is disposed so that its axial position corresponds to the axial position of the Pc port 14 formed in the valve housing 10.

Further, the right axial end 56f of the base portion 56b is able to contact an inner surface 10c corresponding to the movement regulation portion of the pressure-sensitive chamber 40 in the valve housing 10 when opening the differential CS valve 57 (see FIG. 5).

Further, the outward annular convex portion 56e of the differential CS valve body 56 is formed at a position between the Pc port 14 and the second Ps port 15 of the valve housing 10, the outer peripheral surface of the outward annular convex portion 56e and the inner peripheral surface of the valve housing 10 are slightly separated from each other in the radial direction so that a minute gap is formed, and the differential CS valve body 56 slides with respect to the valve housing 10 so as to be smoothly and relatively movable in the axial direction.

Further, the inward annular convex portion 56h of the differential CS valve body 56 is disposed so that the inner peripheral surface faces the outer peripheral surface of the annular convex portion 52d of the pressure-sensitive valve member 52 and the left axial side surface of the inward annular convex portion 56h is provided with the electromagnetic CS valve seat 56k with and from which the right axial end surface 90a of the electromagnetic CS valve body 90 is brought into contact and separated.

Next, the opening and closing mechanism of the differential CS valve 57 will be described. In a state in which the control pressure Pc applied to the differential CS valve body 56 from both sides in the axial direction is balanced, the pressure receiving area of the control pressure Pc applied to the rightward axial direction corresponding to the valve opening direction and the leftward axial direction corresponding to the valve closing direction of the differential CS valve 57 is substantially the same in the differential CS valve body 56 disposed in the pressure-sensitive chamber 40. Accordingly, the control pressure Pc applied to the differential CS valve body 56 from both sides in the axial direction is balanced and the differential CS valve body 56 moves rightward in the axial direction by receiving the urging force of the coil spring 54 so that the differential CS valve 57 is opened (see FIGS. 4 and 5).

On the other hand, in a state in which the suction pressure Ps of the suction chamber 3 is lower than the control pressure Pc of the control chamber 4, the pressure applied to the differential CS valve body 56 from the left side in the axial direction becomes smaller than the pressure applied from the right side in the axial direction, that is, a differential pressure is generated in the axial direction. Accordingly, a force of moving the differential CS valve body 56 leftward in the axial direction (indicated by a white arrow in FIG. 3) acts so that the differential CS valve body 56 moves leftward in the axial direction against the urging force of the coil spring 54 and the differential CS valve 57 is closed (see FIG. 3). Additionally, the differential CS valve 57 is not limited to one that perfectly blocks a gap between the left axial end 56a of the differential CS valve body 56 and the differential CS valve seat 11a of the partition adjustment member 11 and may be configured to throttle the flow of the fluid from the Pc port 14 toward the second Ps port 15.

Next, the operation of the capacity control valve V in the startup state, the normal control state, and the non-energized state will be sequentially described.

Figure 4:
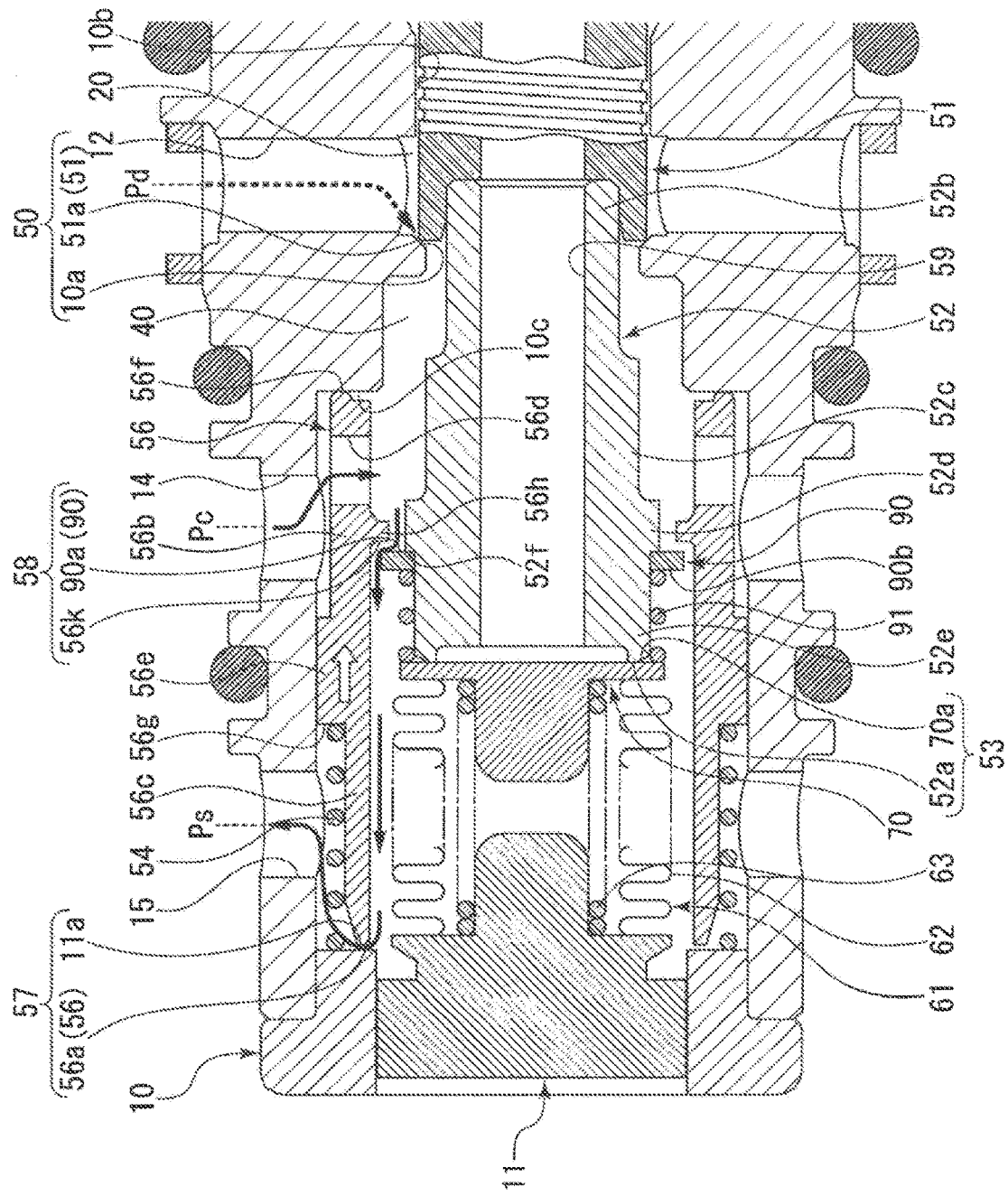
FIG. 4 is an enlarged cross-sectional view illustrating a case in which the primary valve is closed and the differential CS valve and the electromagnetic CS valve are opened in the energized state (e.g., a startup state) of the capacity control valve of the first embodiment.

First, the startup state will be described. After the variable displacement compressor M is left for a long time in a non-use state, the discharge pressure Pd, the control pressure Pc, and the suction pressure Ps are substantially balanced and the control pressure Pc and the suction pressure Ps applied to the differential CS valve body 56 from both sides in the axial direction are balanced, the differential CS valve 57 is opened (see FIG. 4). When the solenoid 80 of the capacity control valve V is energized when starting the variable displacement compressor M, the primary valve 50 is closed and the sub-valve 55 is opened. At this time, as illustrated in FIG. 4, when the differential CS valve 57 is opened so that the Pc port 14 communicates with the second Ps port 15, a liquefied fluid is discharged from the control chamber 4 into the suction chamber 3 through the differential CS valve 57 in a short time and hence the responsiveness at the startup can be improved. Further, as described above, in the capacity control valve V, when the suction pressure Ps of the intermediate communication path 59 is high, the pressure-sensitive valve 53 is opened so that the control pressure Pc is promptly released to the second valve chamber 30 through the intermediate communication path 59 and the communication hole 83a of the drive rod 83. Accordingly, a liquefied fluid is discharged from the control chamber 4 into the suction chamber 3 in a short time by using two flow paths opened by the differential CS valve 57 and the pressure-sensitive valve 53 and hence the responsiveness at the startup can be improved.

Further, in the capacity control valve V of the embodiment, the control pressure Pc decreases in the maximum capacity state of the control chamber 4 so that a differential pressure between the suction pressure Ps and the control pressure Pc becomes equal to or smaller than a predetermined value. That is, in this state, when the pressure-sensitive body 61 expands so as to close the pressure-sensitive valve 53 and the differential CS valve 57 is opened so as to communicate the Pc port 14 with the second Ps port 15, the control pressure Pc and the suction pressure Ps can be maintained at the equal pressure (same pressure). For this reason, since the stroke of the piston 7 in the cylinder 4a of the control chamber 4 is stabilized and the maximum capacity state is maintained, the operation efficiency can be improved. Here, both the differential CS valve 57 and the pressure-sensitive valve 53 are opened by a differential pressure between the control pressure Pc and the suction pressure Ps, but the differential CS valve 57 is set to be operated at a differential pressure smaller than that of the pressure-sensitive valve 53.

Next, the normal control state will be described. In the normal control state, the flow rate of the fluid from the Pd port 12 to the Pc port 14 is controlled by adjusting the opening degree or the opening time of the primary valve 50 according to the duty control of the capacity control valve V. At this time, the balanced state of the control pressure Pc applied to the differential CS valve body 56 from both sides in the axial direction is broken and the differential CS valve body 56 is moved leftward in the axial direction by the control pressure Pc against the urging force of the coil spring 54 so that the differential CS valve 57 is closed (indicated by a dotted arrow in FIG. 3). Accordingly, since it is possible to prevent the leakage of the fluid from the Pc port 14 to the second Ps port 15, it is possible to improve the control accuracy of the control pressure Pc using the capacity control valve V.

Additionally, as illustrated in FIGS. 3 and 4, in the energized state of the capacity control valve V at the startup and the normal control, since the electromagnetic CS valve 58 can be maintained in the opened state in accordance with the reciprocating movement of the primary sub-valve body 51 and the pressure-sensitive valve member 52 in the axial direction without allowing the right axial end surface 90a of the electromagnetic CS valve body 90 to be brought into contact with the electromagnetic CS valve seat 56k of the differential CS valve body 56 regardless of the opened and closed state of the differential CS valve 57, the responsiveness at the startup or the control accuracy of the control pressure Pc is not deteriorated.

Next, the non-energized state will be described. In the non-energized state, as illustrated in FIG. 5, the primary sub-valve body 51 and the pressure-sensitive valve member 52 are pressed rightward in the axial direction by the urging force of the pressure-sensitive body 61 so as to open the primary valve 50 and the right axial end surface 90a of the electromagnetic CS valve body 90 is brought into contact with the electromagnetic CS valve seat 56k of the differential CS valve body 56 so as to close the electromagnetic CS valve 58. Accordingly, since the control fluid passing through the Pc port 14 does not flow into the second Ps port 15, the controllability when restarting the variable displacement compressor M after a short time elapses from the stop state is high and the operation efficiency of the capacity control valve V is high.

Further, since the differential CS valve 57 includes the differential CS valve body 56 and the coil spring 54 urging the differential CS valve body 56 in the valve opening direction and the differential CS valve body 56 constitutes the electromagnetic CS valve seat 56k of the electromagnetic CS valve 58, the capacity control valve V including the differential CS valve 57 and the electromagnetic CS valve 58 has a simple structure.

Further, since the valve housing 10 is provided with the inner surface 10c corresponding to the movement regulation portion that regulates the movement of the differential CS valve body 56 in the rightward axial direction corresponding to the valve opening direction due to the urging of the coil spring 54, the electromagnetic CS valve seat 56k of the differential CS valve body 56 can be disposed at a predetermined position for closing the electromagnetic CS valve 58 by the reliable contact of the right axial end surface 90a of the electromagnetic CS valve body 90 in the non-energized state of the capacity control valve V. Furthermore, since the rightward movement of the electromagnetic CS valve body 90 in the axial direction is also regulated by allowing the right axial end surface 90a to be brought into contact with the electromagnetic CS valve seat 56k of the differential CS valve body 56, the electromagnetic CS valve body 90 and the pressure-sensitive valve member 52 smoothly and relatively move in the axial direction by the sliding regardless of the rightward movement of the primary sub-valve body 51 and the pressure-sensitive valve member 52 in the axial direction. At this time, the inner radial portion of the right axial end surface 90a of the electromagnetic CS valve body 90 is separated in the axial direction from the left axial side surface 52f of the annular convex portion 52d of the pressure-sensitive valve member 52 so that the coil spring 91 contracts (see FIG. 5). Additionally, even when the differential CS valve body 56 moves leftward in the axial direction from the closed state of the electromagnetic CS valve 58 so that the differential CS valve 57 is closed, the electromagnetic CS valve body 90 and the pressure-sensitive valve member 52 are smoothly and relatively movable in the axial direction while contracting the coil spring 91.

Further, since the electromagnetic CS valve 58 includes the electromagnetic CS valve body 90 and the coil spring 91 which urges the electromagnetic CS valve body 90 rightward in the axial direction corresponding to the valve closing direction, the electromagnetic CS valve 58 can be reliably closed by the coil spring 91 in the non-energized state of the capacity control valve V.

Further, since the capacity control valve V has a structure in which the differential CS valve body 56 and the coil spring 54 are inserted from the left axial end of the valve housing 10 into the pressure-sensitive chamber 40 and the partition adjustment member 11 is press-fitted and fixed along with the pressure-sensitive body 61 to which the electromagnetic CS valve body 90 and the coil spring 91 are integrally fixed, the assembling is easy.

Second Embodiment

Next, a capacity control valve according to a second embodiment of the present invention will be described with reference to FIG. 6. Additionally, the same components as those of the above-described embodiment will be denoted by the same reference numerals and redundant description will be omitted.

A capacity control valve V of the second embodiment will be described. As illustrated in FIG. 6, in the embodiment, an electromagnetic CS valve 158 is a spool valve structure and includes an annular convex portion 152d which is formed on an outer peripheral surface of a pressure-sensitive valve member 152 and an electromagnetic CS valve seat 56m which is formed on the inner peripheral surface of the inward annular convex portion 56h of the differential CS valve body 56 and the electromagnetic CS valve 158 is opened and closed when the annular convex portion 152d of the pressure-sensitive valve member 152 is brought into contact with and separated from the electromagnetic CS valve seat 56m.

Figure 6A:
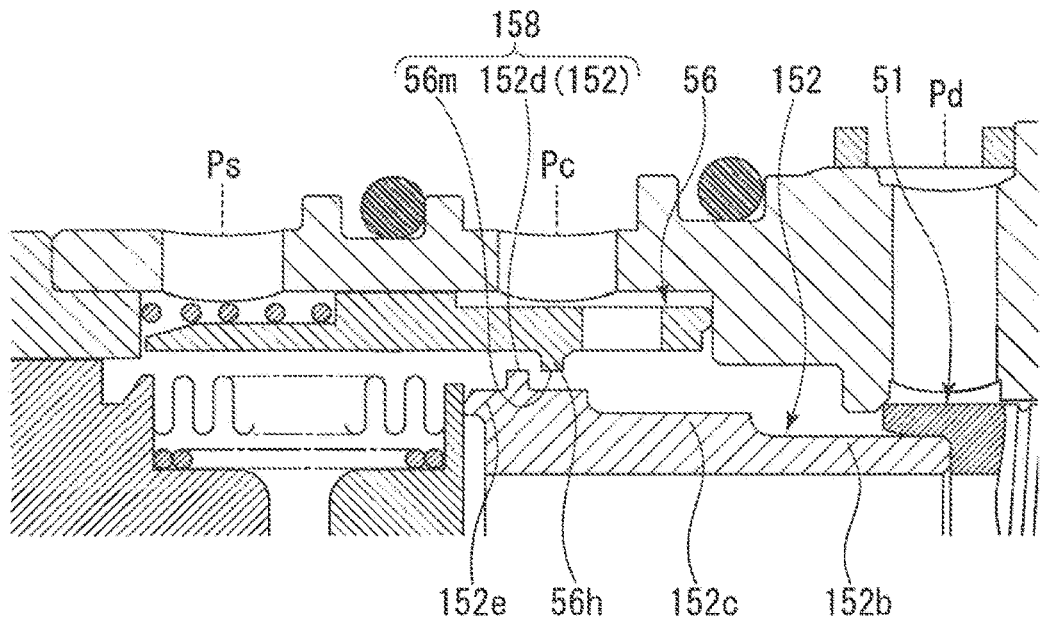
FIG. 6A is an enlarged cross-sectional view of a main part of a differential CS valve and an electromagnetic CS valve in an energized state (e.g., startup state) of a capacity control valve according to a second embodiment of the present invention

As illustrated in FIG. 6, the pressure-sensitive valve member 152 is formed in a substantially cylindrical shape including a first cylindrical portion 152b to which the left axial end portion of the primary sub-valve body 51 is connected and fixed, a second cylindrical portion 152c which is formed on the left side of the first cylindrical portion 152b in the axial direction so as to have a diameter larger than that of the first cylindrical portion 152b, a contact portion 152e which is formed on the left side of the second cylindrical portion 152c in the axial direction so as to have a diameter larger than that of the second cylindrical portion 152c and is provided with a pressure-sensitive valve seat 152a brought into contact with and separated from the seal surface 70a of the cap 70 constituting the pressure-sensitive body 61, and the annular convex portion 152d which protrudes outward in the radial direction from the outer peripheral surface of the contact portion 152e.

Further, the electromagnetic CS valve seat 56m formed on the inner peripheral surface of the inward annular convex portion 56h of the differential CS valve body 56 and the outer peripheral surface of the annular convex portion 152d of the pressure-sensitive valve member 152 are slightly separated from each other in the radial direction so that a minute gap is formed and the differential CS valve body 56 and the pressure-sensitive valve member 152 are smoothly and relatively movable in the axial direction by the sliding.

Figure 6B:
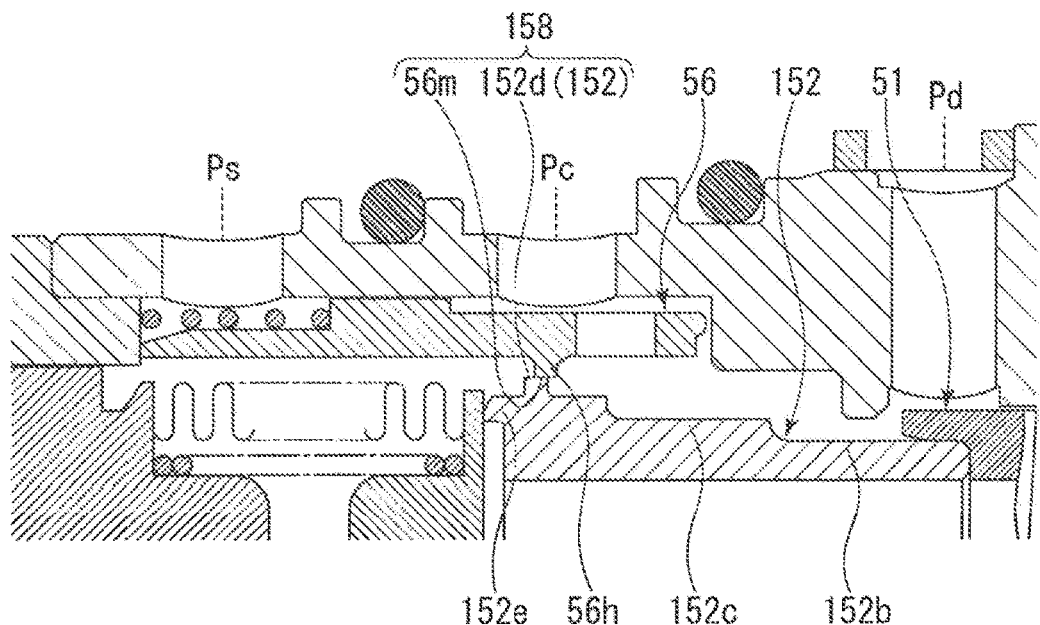
FIG. 6B is an enlarged cross-sectional view of a main part of the differential CS valve and the electromagnetic CS valve in a non-energized state thereof.

The annular convex portion 152d of the pressure-sensitive valve member 152 moves in a reciprocating manner in the axial direction so as to change an overlapping amount with the electromagnetic CS valve seat 56m formed on the inner peripheral surface of the inward annular convex portion 56h of the differential CS valve body 56 when viewed from the radial direction and the electromagnetic CS valve 158 is closed at an overlapping position between the annular convex portion 152d and the electromagnetic CS valve seat 56m when viewed from the radial direction (see FIG. 6B).

Further, since the electromagnetic CS valve 158 is formed in a spool valve structure by the annular convex portion 152d of the pressure-sensitive valve member 152 and the electromagnetic CS valve seat 56m of the differential CS valve body 56, the electromagnetic CS valve 158 is closed when the primary sub-valve body 51 and the pressure-sensitive valve member 52 are stroked by a predetermined amount or more in the axial direction and hence the electromagnetic CS valve 158 can be reliably closed. Further, since the electromagnetic CS valve 158 is maintained in the closed state even when the primary sub-valve body 51 and the pressure-sensitive valve member 52 are slightly moved in the axial direction due to disturbances such as vibration, for example, in the non-energized state, the capacity control valve V is strong against disturbance and has excellent control accuracy.

Additionally, an example in which the electromagnetic CS valve 158 is formed by the outer peripheral surface of the annular convex portion 152d of the pressure-sensitive valve member 152 and the electromagnetic CS valve seat 56m formed on the inner peripheral surface of the inward annular convex portion 56h of the differential CS valve body 56 has been described. However, for example, the pressure-sensitive valve member 152 may be provided with the annular convex portion 152d, the inner peripheral surface of the differential CS valve body 56 may not be provided with the annular convex portion, and the inner peripheral surface may be formed as the electromagnetic CS valve seat. Alternatively, the outer peripheral surface of the pressure-sensitive valve member 152 may not be provided with the annular convex portion and the outer peripheral surface may be brought into contact with and separated from the electromagnetic CS valve seat 56m of the inward annular convex portion 56h of the differential CS valve body 56. In this way, the pressure-sensitive valve member 152 or the differential CS valve body 56 can be simply manufactured and there is no possibility that the pressure-sensitive valve member 152 or the differential CS valve body 56 is tilted due to a tilting load or the like so that the annular convex portion 152d of the pressure-sensitive valve member 152 engages with the inward annular convex portion 56h of the differential CS valve body 56.

Although the embodiments of the present invention have been described above with reference to the drawings, a detailed configuration is not limited to these embodiments and modifications or additions in the scope not departing from the spirit of the present invention are also included in the present invention.

For example, an example in which the primary sub-valve body 51 and the pressure-sensitive valve member 52 are formed as separate members has been described, but both members may be integrated with each other.

Further, a fixed orifice and a communication path directly communicating the control chamber 4 of the variable displacement compressor M with the suction chamber 3 may not be provided.

Further, in the above-described embodiment, the sub-valve may not be provided and the right axial end of the primary sub-valve body does not need to have a sealing function when the right axial end functions as a support member that receives an axial load.

Further, the coil springs 54 and 91 are not limited to compression springs, but may be tension springs or may have a shape other than a coil shape.

Further, in the electromagnetic CS valve, the electromagnetic CS valve seat is formed by using a part of the differential CS valve body, but the electromagnetic CS valve seat may be formed by using a part of other members.

Further, the pressure-sensitive body 61 may not use a coil spring therein.

REFERENCE SIGNS LIST

1 Casing
2 Discharge chamber
3 Suction chamber
Control chamber
4 Valve housing
10a Primary valve seat
10b Guide surface
10c Inner surface (movement regulation portion)
11 Partition adjustment member
11a Differential CS valve seat
12 Pd port (discharge port)
13 First Ps port (suction port, first suction port)
14 Pc port (control port)
15 Second Ps port (suction port, second suction port)
20 First valve chamber 30 Second valve chamber
40 Pressure-sensitive chamber
50 Primary valve
51 Primary sub-valve body (primary valve body, hollow rod)
51a Left axial end
51b Right axial end
52 Pressure-sensitive valve member (hollow rod)
52a Pressure-sensitive valve seat
52d Annular convex portion
53 Pressure-sensitive valve (pressure drive valve)
54 Coil spring (differential CS spring)
55 Sub-valve
56 Differential CS valve body
56a Left axial end
56b Base portion
56c Attachment portion
56d Through-hole
56e Outward annular convex portion
56f Right axial end
56g Side surface
56h Inward annular convex portion
56k Electromagnetic CS valve seat
56m Electromagnetic CS valve seat
57 Differential CS valve
58 Electromagnetic CS valve
59 Intermediate communication path (hollow communication path)
61 Pressure-sensitive body
62 Bellows core
63 Coil spring
70 Cap
70a Seal surface
80 Solenoid
82 Fixed iron core
82a Sub-valve seat
90 Electromagnetic CS valve body
90a Right axial end surface
90b Side surface
92 Coil spring (electromagnetic CS spring)
152 Pressure-sensitive valve member
152a Pressure-sensitive valve seat
152d Annular convex portion
152e Contact portion
158 Electromagnetic CS valve
Pc Control pressure
Pd Discharge pressure
Ps Suction pressure
V Capacity control valve

The invention claimed is:

1. A capacity control valve comprising:
a valve housing provided with a discharge port allowing a discharge fluid of a discharge pressure to pass therethrough, a suction port allowing a suction fluid of a suction pressure to pass therethrough, and a control port allowing a control fluid of a control pressure to pass therethrough;
a primary valve including a primary valve seat and a primary valve body driven by a solenoid, the primary valve being configured to open and close a communication between the discharge port and the control port in accordance with a movement of the primary valve body;
the primary valve body being connected and fixed to a pressure-sensitive valve member;
a pressure-sensitive valve that is formed by the pressure-sensitive valve member and a free end portion of a pressure-sensitive body fixed to the valve housing and that is configured to open and close communication between an outside of the pressure-sensitive body and an inside of the primary valve body,
a differential CS valve that is disposed in a pressure-sensitive chamber having the pressure-sensitive valve housed therein so as to be formed separately from the pressure-sensitive valve and that is openable and closable by a pressure difference between the control pressure and the suction pressure; and
an electromagnetic CS valve that is disposed in the pressure-sensitive chamber and that is operable and closable so as to close communication between the control port and the suction port in a non-energized state of the solenoid in accordance with the movement of the primary valve body.

2. The capacity control valve according to claim 1, wherein the suction port includes a first suction port and a second suction port,
the first suction port, the discharge port, the control port, and the second suction port being sequentially disposed from a side of the solenoid.

3. The capacity control valve according to claim 1, wherein the pressure-sensitive valve member includes a hollow rod provided with a hollow communication path capable of communicating the control port with the suction port by opening and closing the pressure-sensitive valve.

4. The capacity control valve according to claim 3, wherein the suction port includes a first suction port and a second suction port,
the first suction port, the discharge port, the control port, and the second suction port being sequentially disposed from a side of the solenoid.

5. The capacity control valve according to claim 1, wherein the electromagnetic CS valve includes an electromagnetic CS valve body and an electromagnetic CS spring configured to urge the electromagnetic CS valve body in a valve closing direction.

6. The capacity control valve according to claim 5, wherein the pressure sensitive valve member includes a hollow rod provided with a hollow communication path capable of communicating the control port with the suction port by opening and closing the pressure-sensitive valve.

7. The capacity control valve according to claim 5, wherein the suction port includes a first suction port and a second suction port,
the first suction port, the discharge port, the control port, and the second suction port being sequentially disposed from a side of the solenoid.

8. The capacity control valve according to claim 1, wherein a differential CS valve body of the differential CS valve partially constitutes an electromagnetic CS valve seat of the electromagnetic CS valve.

9. The capacity control valve according to claim 8, wherein the differential CS valve includes, in addition to the differential CS valve body of a cylindrical shape, a differential CS spring which urges the differential CS valve body in a valve opening direction of the differential CS valve.

10. The capacity control valve according to claim 8, wherein the electromagnetic CS valve includes an electromagnetic CS valve body and an electromagnetic CS spring configured to urge the electromagnetic CS valve body in a valve closing direction.

11. The capacity control valve according to claim 8,
wherein the pressure-sensitive valve member includes a hollow rod provided with a hollow communication path capable of communicating the control port with the suction port by opening and closing the pressure-sensitive valve.

12. The capacity control valve according to claim 8,
wherein the suction port includes a first suction port and a second suction port,
the first suction port, the discharge port, the control port, and the second suction port being sequentially disposed from a side of the solenoid.

13. The capacity control valve according to claim 9,
wherein the valve housing is provided with a movement regulation portion configured to regulate a movement of the differential CS valve body due to a force of the differential CS spring.

14. The capacity control valve according to claim 9,
wherein the electromagnetic CS valve includes an electromagnetic CS valve body and an electromagnetic CS spring configured to urge the electromagnetic CS valve body in a valve closing direction.

15. The capacity control valve according to claim 9,
wherein the pressure-sensitive valve member includes a hollow rod provided with a hollow communication path capable of communicating the control port with the suction port by opening and closing the pressure-sensitive valve.

16. The capacity control valve according to claim 9,
wherein the suction port includes a first suction port and a second suction port,
the first suction port, the discharge port, the control port, and the second suction port being sequentially disposed from a side of the solenoid.

17. The capacity control valve according to claim 9,
wherein the electromagnetic CS valve includes an electromagnetic CS valve body and an electromagnetic CS spring configured to urge the electromagnetic CS valve body in a valve closing direction.

18. The capacity control valve according to claim 4,
wherein the pressure-sensitive valve member includes a hollow rod provided with a hollow communication path capable of communicating the control port with the suction port by opening and closing the pressure-sensitive valve.

19. The capacity control valve according to claim 13,
wherein the suction port includes a first suction port and a second suction port,
the first suction port, the discharge port, the control port, and the second suction port being sequentially disposed from a side of the solenoid.

\* \* \* \* \*